(12) United States Patent
Stein et al.

(10) Patent No.: US 7,681,554 B2
(45) Date of Patent: Mar. 23, 2010

(54) APPROACH FOR REDUCING INJECTOR FOULING AND THERMAL DEGRADATION FOR A MULTI-INJECTOR ENGINE SYSTEM

(75) Inventors: Robert A. Stein, Saline, MI (US); Leslie Bromberg, Sharon, MA (US); Paul N. Blumberg, Southfield, MI (US); Daniel R. Cohn, Cambridge, MA (US); John B. Heywood, Newton, MA (US)

(73) Assignees: Ford Global Technologies, LLC, Dearborn, MI (US); Ethanol Boosting Systems, LLC, Cambridge, MA (US)

( * ) Notice: Subject to any disclaimer, the term of this patent is extended or adjusted under 35 U.S.C. 154(b) by 397 days.

(21) Appl. No.: 11/776,120

(22) Filed: Jul. 11, 2007

(65) Prior Publication Data

US 2008/0017171 A1 Jan. 24, 2008

Related U.S. Application Data

(60) Provisional application No. 60/832,836, filed on Jul. 24, 2006.

(51) Int. Cl.
*F02D 41/30* (2006.01)
*F02B 13/10* (2006.01)

(52) U.S. Cl. .................... 123/478; 123/198 A
(58) Field of Classification Search ............. 123/478, 123/198 A
See application file for complete search history.

(56) References Cited

U.S. PATENT DOCUMENTS

| 2,221,405 | A | 11/1940 | Nallinger |
|---|---|---|---|
| 3,589,348 | A | 6/1971 | Reichhelm |
| 3,794,000 | A | 2/1974 | Hodgkinson |
| 4,031,864 | A | 6/1977 | Crothers |
| 4,136,652 | A | 1/1979 | Lee |
| 4,205,650 | A | 6/1980 | Szwarcbier |

(Continued)

FOREIGN PATENT DOCUMENTS

EP 1057988 1/2006

(Continued)

OTHER PUBLICATIONS

U.S. Appl. No. 60/780,319, filed Mar. 8, 2006, Bromberg et al.

(Continued)

*Primary Examiner*—Stephen K Cronin
*Assistant Examiner*—Arnold Castro
(74) *Attorney, Agent, or Firm*—Alleman Hall McCoy Russell & Tuttle LLP

(57) ABSTRACT

As one embodiment, a method of operating an engine of a vehicle is provided wherein the engine has a variable engine output. The method comprises during a first engine output, delivering a first fuel to at least a cylinder of the engine via a first injector and directly injecting a second fuel directly into said cylinder via a second injector; and during a second engine output lower than said first engine output, delivering said first fuel to said at least a cylinder of the engine via said first injector and directly injecting at least a purging substance via said second injector based on an idle period since a previous injection by said second injector.

23 Claims, 9 Drawing Sheets

U.S. PATENT DOCUMENTS

| | | | |
|---|---|---|---|
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,402,296 A | 9/1983 | Schwarz | |
| 4,411,243 A | 10/1983 | Hardenberg et al. | |
| 4,480,616 A | 11/1984 | Takeda | |
| 4,489,596 A | 12/1984 | Linder et al. | |
| 4,502,453 A | 3/1985 | Kabasin et al. | |
| 4,590,904 A | 5/1986 | Wannenwetsch | |
| 4,648,367 A | 3/1987 | Gillbrand et al. | |
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,111,795 A | 5/1992 | Thompson | |
| 5,131,228 A | 7/1992 | Mochizuki et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,829,460 A * | 11/1998 | Acevedo | 134/102.2 |
| 5,875,743 A | 3/1999 | Dickey | |
| 5,921,222 A | 7/1999 | Freeland | |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,318,083 B1 | 11/2001 | Machida et al. | |
| 6,382,225 B1 | 5/2002 | Tipton | |
| 6,494,192 B1 | 12/2002 | Capshaw | |
| 6,505,579 B1 * | 1/2003 | Lee | 123/25 A |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,664 B2 | 9/2003 | Holder et al. | |
| 6,622,690 B2 | 9/2003 | Ando et al. | |
| 6,651,432 B1 | 11/2003 | Gray, Jr. | |
| 6,659,068 B2 | 12/2003 | Urushihara et al. | |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,845,616 B2 | 1/2005 | Jauss | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 * | 12/2005 | Mori | 123/430 |
| 6,988,485 B2 | 1/2006 | Ichise et al. | |
| 6,990,956 B2 * | 1/2006 | Niimi | 123/406.47 |
| 7,055,500 B2 * | 6/2006 | Miyashita et al. | 123/406.47 |
| 7,082,926 B2 | 8/2006 | Sadakane et al. | |
| 7,159,568 B1 | 1/2007 | Lewis et al. | |
| 7,178,503 B1 | 2/2007 | Brehob | |
| 7,225,787 B2 * | 6/2007 | Bromberg et al. | 123/198 A |
| 7,255,080 B1 | 8/2007 | Leone | |
| 7,261,064 B2 | 8/2007 | Bhaisora et al. | |
| 7,278,396 B2 * | 10/2007 | Leone et al. | 123/431 |
| 7,287,492 B2 * | 10/2007 | Leone et al. | 123/1 A |
| 7,287,509 B1 | 10/2007 | Brehob | |
| 7,293,552 B2 | 11/2007 | Leone et al. | |
| 7,314,033 B2 * | 1/2008 | Cohn et al. | 123/198 A |
| 7,412,966 B2 * | 8/2008 | Lewis et al. | 123/431 |
| 7,444,987 B2 * | 11/2008 | Cohn et al. | 123/431 |
| 7,533,651 B2 * | 5/2009 | Surnilla | 123/304 |
| 7,549,408 B2 * | 6/2009 | Russell | 123/481 |
| 2001/0035215 A1 | 11/2001 | Tipton et al. | |
| 2003/0089337 A1 | 5/2003 | Cohn et al. | |
| 2003/0127072 A1 | 7/2003 | Gmelin et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane et al. | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami et al. | |
| 2007/0028861 A1 | 2/2007 | Kamio et al. | |
| 2007/0028905 A1 | 2/2007 | Shinagawa | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 * | 5/2007 | Lewis et al. | 123/431 |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |

| | | | |
|---|---|---|---|
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219674 A1 | 9/2007 | Leone | |
| 2007/0219701 A1 | 9/2007 | Hashimoto et al. | |
| 2007/0221163 A1 | 9/2007 | Kamio | |
| 2007/0234976 A1 | 10/2007 | Dearth et al. | |
| 2007/0289573 A1 | 12/2007 | Leone et al. | |
| 2007/0295307 A1 | 12/2007 | Kerns | |

FOREIGN PATENT DOCUMENTS

| | | |
|---|---|---|
| JP | 61065066 | 4/1986 |
| JP | 2007/0756754 | 3/2007 |
| WO | WO 2004/097198 | 11/2004 |
| WO | WO 2006/055540 | 5/2006 |
| WO | WO 2007/106354 | 9/2007 |
| WO | WO 2007/106416 | 9/2007 |

OTHER PUBLICATIONS

U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8. 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10. 2006, Bromberg et al.
U.S. Appl. No. 60/746,507, filed May 5, 2006, Cohn et al
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/566,131, filed Dec. 1, 2006, Blumberg et al.
U.S. Appl. No. 11/962,683, filed Dec. 21, 2007, Pursifull et al.
U.S. Appl. No. 12/014,952, filed Jan. 16, 2008, Leone et al.
D.R. Crohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Techonology.
L. Bromberg et al., "Calculations of Knock Suppressions in Highly Turbocharged Gasoline/Ethanol Engines Using Direct Ethanol Injection", Jul. 7, 2005, Massachusetts Institute of Technology.
Stephen Russ, "A Review of the Effect of Engine Operating Conditions on Borderline Knock", SAE Technical Paper Series 960497, Feb. 26-29, 1996.
S. Brusca et al., "Water Injection in IC - SI Engines to Control Detonation and to Reduce Pollutant Emissions", SAE Technical Paper No. 2003-01-1912, May 19-22, 200.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

* cited by examiner

APPROACH FOR REDUCING INJECTOR FOULING AND THERMAL DEGRADATION FOR A MULTI-INJECTOR ENGINE SYSTEM

The present application claims priority to U.S. Provisional Patent Application No. 60/832,836, filed Jul. 24, 2006, and entitled "Single Nozzle System for Rapidly Variable Direct Injection of Gasoline and Ethanol Mixtures", the entire contents of which are incorporated herein by reference.

BACKGROUND AND SUMMARY

Engines may use various forms of fuel delivery to provide a desired amount of fuel for combustion in each cylinder. One type of fuel delivery uses a port injector to deliver fuel to respective cylinders. Still another type of fuel delivery uses a direct injector for each cylinder.

Engines have been described utilizing multiple injector locations with different fuel types. One example is described in the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. Specifically, the Heywood et al. papers describes directly injecting ethanol to improve charge cooling effects, while relying on port injected gasoline for providing the majority of combusted fuel over a drive cycle.

The inventors herein have recognized that under some conditions, such as where one of the injectors is not continuously injecting a fuel or other substance, subsequent operation of the injector may become degraded where injector fouling occurs. As one example, a direct injector may become fouled where soot or other products of combustion form on or around the injector nozzle, thereby reducing injector performance.

The inventors herein have also recognized that the temperature of the injector may increase during periods where the injector is not performing an injection since the injection of a substance can cool the injector and/or stagnation of the substance downstream of the injector may remove less heat from injector. If the period between injection events becomes too great, the injector can exceed a temperature threshold at which injector degradation and/or failure occurs. Further, at high injector temperatures, the substance passing through the injector may be damaged or may foul the injector.

Thus, in one approach, a method of operating an engine of a vehicle is provided wherein the engine has a variable engine output. The method comprises during a first engine output, delivering a first fuel to at least a cylinder of the engine via a first injector and directly injecting a second fuel directly into said cylinder via a second injector; and during a second engine output lower than said first engine output, delivering said first fuel to said at least a cylinder of the engine via said first injector and directly injecting at least a purging substance via said second injector based on an idle period since a previous injection by said second injector. In this way, fouling or thermal degradation of the injector may be reduced by periodically purging the injector with a purging substance.

Additionally, the inventors have recognized that purging of an injector may cause variation in the oxygen content and/or caloric content of the fuel mixture delivered to the engine. Thus, in situations where purging is utilized to reduce injector fouling or thermal degradation, undesirable variations or departures from a requested air/fuel ratio of the cylinder charge and/or torque production by the engine may occur.

Thus, the method may further vary an amount of the first fuel that is injected via the first injector responsive to an amount of the purging substance that is injected via the second injector. In this way, the requested air/fuel ratio and engine torque output may be achieved while reducing injector fouling and thermal degradation.

DETAILED DESCRIPTION

Gasoline engines, particularly those with a boosting device, may employ a variable direct injection of a knock suppressing fuel such as an alcohol or alcohol blend to provide improved performance. As one prophetic example, a high compression ratio, boosted engine configured with selective and variable ethanol direct injection in addition to gasoline injection may achieve a 20%-30% increase in efficiency over a naturally aspirated spark ignition engine when delivering the same torque and power. The directly injected ethanol can provide a large knock suppression effect due in part to the evaporative cooling of the fuel/air charge within the cylinder of the engine. This improvement in efficiency can enable the engine to be substantially downsized and/or operate at a higher compression ratio while providing a similar level of performance.

Figure 1:
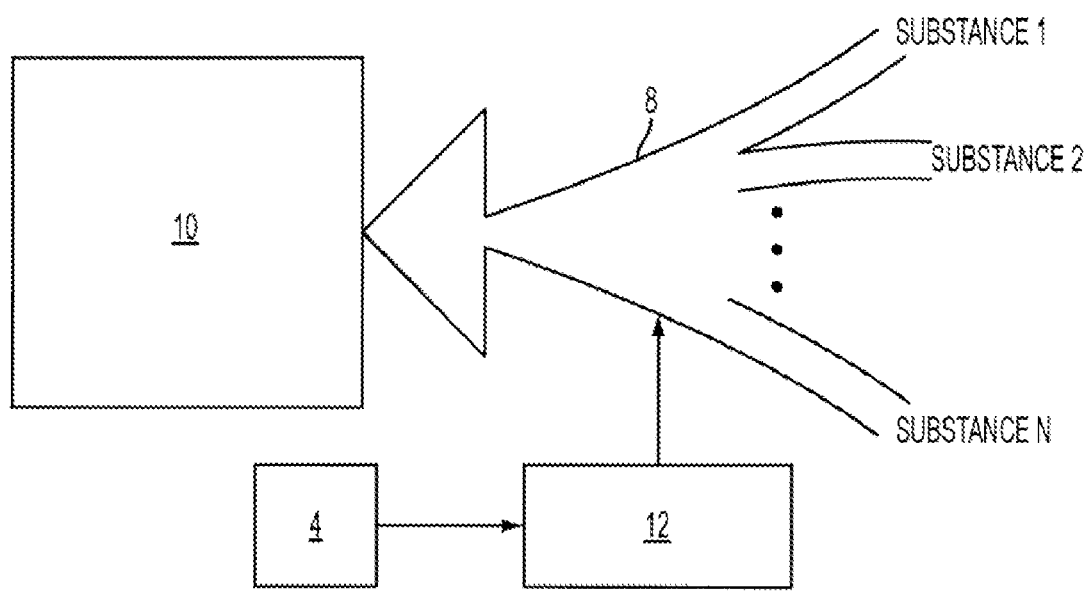
FIG. 1 is a schematic illustration of an example engine 10 receiving delivery of a plurality of substances.

FIG. 1 is a schematic illustration of an example engine 10 receiving delivery of a plurality of substances ($1, 2, \ldots, N$) as indicated by arrow 8. The various substances may include multiple different fuels, fuel blends, injection locations, or various other alternatives.

For example, multiple different substances having different gasoline, alcohol and/or water concentrations may be delivered to the engine. These substances may be delivered in a mixed state or may be delivered separately. Further, the relative amounts of the different substances that are delivered to the engine may be variably controlled by a control system 12 in response to operating conditions, which may be identified via one or more sensors indicated at 4. These sensors may include engine sensors, transmission sensors, vehicle sensors, and ambient condition sensors, among others.

As one non-limiting example, different substances may represent different fuels having different levels of alcohol and/or octane. For example, a first substance may include gasoline and a second substance may include an alcohol such as ethanol or methanol. As another example, a first substance may include a first blend or mixture of different fuels and a second substance may include a blend or mixture of fuels, whereby the second substance includes a higher concentration of at least one component than the first substance. As one example, this component may include water, gasoline, diesel, dimethyl ether, a methyl ester, a lower alkyl alcohol (such as methanol, ethanol, propanol, or butanol etc. Thus, these fuel blends may include E85 (which includes approximately nominally 85% ethanol and 15% gasoline, but in practice closer to 80% ethanol and 20% gasoline by volume), M85 (which is approximately 85% methanol and 15% gasoline), E10 (which is approximately 90% gasoline and 10% ethanol), or other suitable mixture. Thus, as described herein, the term substance may include a pure substance or a mixture of two or more different substances.

These different substances may be delivered to the engine in a variety of ways. In some embodiments, different injectors may be used for delivering the different substances. Further, these injectors may be located in similar or different locations of the engine. For example, a first injector may be configured as a direct injector to inject a first substance directly into a combustion chamber of the engine while a second injector may be configured as a port injector to inject a second substance into an intake passage of the engine upstream of the combustion chamber. Alternatively, a first injector for injecting a first substance and a second injector for injecting a second substance may both be configured as direct injectors for delivering the substances directly into the combustion chamber of the engine.

In some embodiments, a single injector may be used to selectively deliver two substances to the engine, whereby the two substances may be provided as a mixture or separately based on the selected position of a mixing valve arranged upstream of the injector. For example, a first substance may be delivered directly into a combustion chamber of the engine as a first injection event and a second substance may be delivered to the combustion chamber as a second injection event via the same direct injector. Alternatively, the first substance and the second substance may be delivered to the combustion chamber as a mixture via a single injection event by the direct injector. Thus, it should be appreciated that the injection of the first fuel and the second fuel may be performed either simultaneously or at different times.

Various advantageous results may be obtained by one or more of the above described systems. For example, when using both gasoline and a second fuel including an alcohol (e.g., ethanol), it may be possible to adjust the relative amounts of the fuels delivered to the engine to take advantage of the increased charge cooling of alcohol fuels (e.g., via direct injection), thereby reducing the tendency of knock. This phenomenon, combined with increased compression ratio, and/or boosting (including increasing manifold pressure) and/or engine downsizing, can then be used to obtain increased fuel economy benefits (by reducing the knock limitations on the engine), while allowing the engine to operate on gasoline at lighter loads when knock is not as great a constraint.

Figure 2:
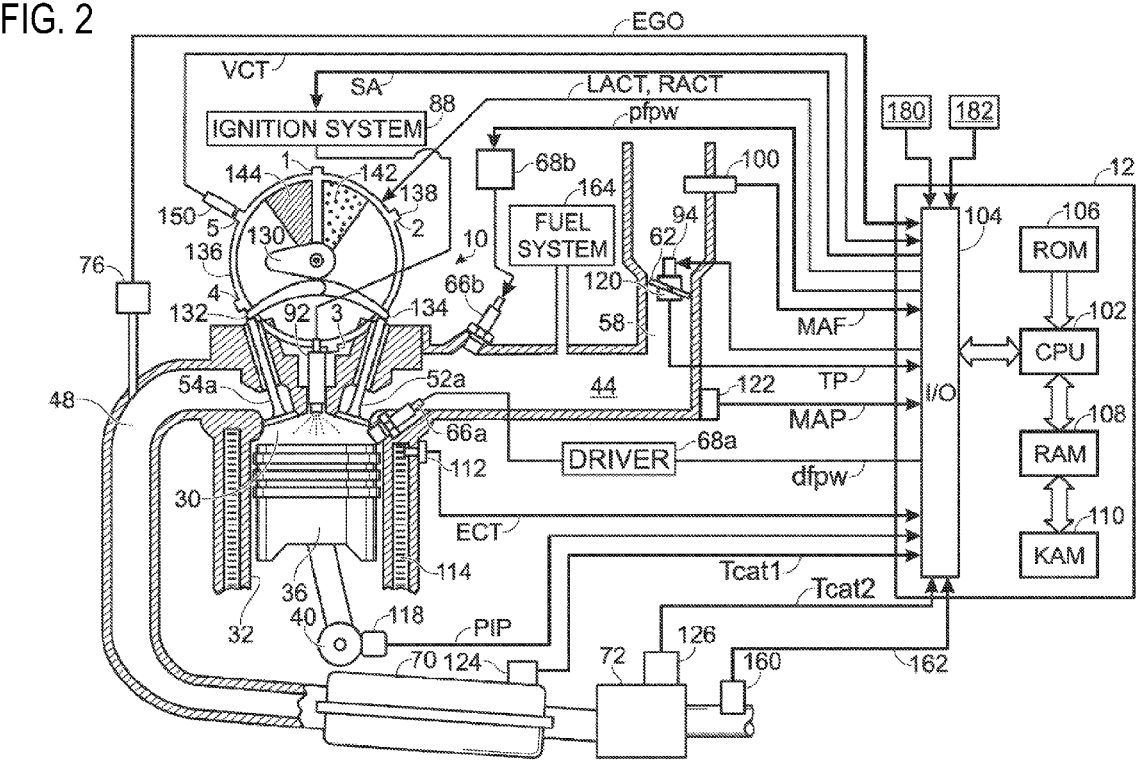
FIG. 2 illustrates an example cylinder of the engine of FIG. 1 in greater detail.

FIG. 2 illustrates an example cylinder or combustion chamber 30 of engine 10 in greater detail. Engine 10 as illustrated and described herein may be included in a vehicle such as a road automobile, among other types of vehicles. In some examples, engine 10 may be included as a portion of a hybrid propulsion system including one or more other motors or engines, such as in the case of a hybrid electric vehicle (HEV). While the example applications of engine 10 will be described with reference to vehicles, it should be appreciated that engine 10 may be used in other applications not necessarily confined to vehicle propulsion systems.

In the particular embodiment shown in FIG. 2, the engine includes a fuel system with two fuel injectors per cylinder, for at least one cylinder of the engine. In some embodiments, each cylinder of the engine may include two fuel injectors. The two injectors may be configured in various locations, such as two port injectors, one port injector and one direct injector (as shown in FIG. 2), two direct injectors, a single, two-fuel direct injector, or in other configurations.

Continuing with FIG. 2, a multiple injection system is illustrated, where engine 10 includes both direct and port fuel injection, as well as spark ignition. Internal combustion engine 10, comprising a plurality of combustion chambers, is controlled by electronic engine control system 12. Combustion chamber 30 of engine 10 is shown including combustion chamber walls 32 with piston 36 positioned therein and connected to crankshaft 40. In one particular example, piston 36 may include a recess or bowl (not shown) to help in forming stratified charges of air and fuel, if desired. However, in an alternative embodiment, a flat faced piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another embodiment, a single intake and single exhaust valve per cylinder may also be used. In still other embodiments, two intake valves and one exhaust valve per cylinder may be used. Still further, three or more intake valves and/or three or more exhaust valves per cylinder may be used.

Combustion chamber 30 can have a compression ratio, which is the ratio of volumes between when piston 36 is at bottom center to when piston 36 is at top center. In one example, the compression ratio may be within a range of approximately 13:1-15:1. However, other compression ratios may be used including compression ratios greater than 15:1 or less than 13:1. For example, at compression ratios greater than 15:1, a greater amount of knock suppressing fuel or fuel mixture may be used to reduce knock, while at compression ratios less than 13:1, a lesser amount of knock suppressing fuel or fuel mixture may be used to reduce knock.

Fuel injector 66a is shown directly coupled to combustion chamber 30 for delivering injected fuel directly therein in proportion to the pulse width of signal dfpw received from control system 12 via electronic driver 68a. While FIG. 2 shows injector 66a as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing. As one non-limiting example, one or more of injectors 66a and 66b may be configured as a fast acting injector (e.g. configured to provide a substantially short pulse width), in order to minimize or reduce the amount of fuel or other purging substance that is used to purge the injector as will be described in greater detail herein.

Fuel may be delivered to fuel injector 66a by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to control system 12.

Fuel injector 66b is shown coupled to intake manifold 44, rather than directly to cylinder 30. Fuel injector 66b delivers injected fuel in proportion to the pulse width of signal pfpw received from control system 12 via electronic driver 68b. Note that a single driver may be used for both fuel injection systems, or multiple drivers may be used. Fuel system 164 is also shown in schematic form delivering vapors to intake manifold 44, where fuel system 164 is also coupled to injectors 66a and 66a (although not shown in this FIG.). Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by control system 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may include any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to control system 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein. Sensor 160 may also provide an indication of oxygen concentration in the exhaust gas via signal 162, which provides control system 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors. Emission control device 72 is shown positioned downstream of catalytic converter 70. Emission control device 72 may be a three-way catalyst or a NOx trap, or combinations thereof.

Ignition system 88 provides ignition spark to combustion chamber 30 via spark plug 92 in response to spark advance signal SA from control system 12. However, in some embodiments, spark plug 10 and ignition system 88 may be omitted, whereby ignition of an air and fuel mixture within combustion chamber 30 is achieved by compression ignition.

Control system 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66a during a compression stroke. In another example, a homogenous mixture may be formed by operating one or both of injectors 66a and 66b during an intake stroke (which may be open valve injection). In yet another example, a homogenous mixture may be formed by operating one or both of injectors 66a and 66b before an intake stroke (which may be closed valve injection). In still other examples, multiple injections from one or both of injectors 66a and 66b may be used during one or more strokes (e.g., intake, compression, exhaust, etc.). Even further examples may be where different injection timings and mixture formations are used under different conditions, as described below. It would also be possible to operate one injector such that the fuel from this injector is homogeneously distributed through the cylinder (such as per early injection of this fuel, or appropriate fuel spray pattern), while the second fuel, from another injector is inhomogeneously distributed through the cylinder (as per late injection of the second fuel). Further, it is possible, through multiple injections of a single fuel, to have a portion of either first or second fuels be homogeneously distributed, while the balance of the fuel be inhomogeneously distributed.

Control system 12 can control the amount of fuel delivered by fuel injectors 66a and 66b so that the homogeneous, stratified, or combined homogenous/stratified overall air/fuel mixture in chamber 30 can be selected to be at stoichiometry, a value rich of stoichiometry, or a value lean of stoichiometry. While not shown in FIG. 2, the control system can be configured to receive temperature information from one or both of injectors 66a and 66b. As one non-limiting example, injector 66a or 66b may include a temperature sensor of measuring injector temperature.

While FIG. 2 shows a cylinder configured with a direct injector and a port injector, in an alternative embodiment, the cylinder may include two direct injectors or two port injectors. As one example, where the cylinder includes two port injectors, at least one of the port injectors may be operated to perform what may be referred to as an open valve injection, whereby the port injector performs an injection while at least one intake valve of the cylinder is opened. In this way, a port injection of a substance can be used to achieve some of the advantages of direct injection without requiring the injector to be disposed within the cylinder.

Control system 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Control system 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by control system 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this particular example includes a system in which the intake and exhaust valve timing are controlled concurrently, variable intake cam timing, variable exhaust cam timing, dual independent variable cam timing, or fixed cam timing may be used. Further, variable valve lift may also be used. Camshaft profile switching may be used to provide different cam profiles under different operating conditions. Further still, the valvetrain may include roller finger followers, direct acting mechanical buckets or other alternatives to rocker arms. The valvetrain may be of a non-conventional type including non-mechanical elements such as electromechanical or electrohydraulic valve mechanisms.

Continuing with the variable cam timing system, teeth 138, being coupled to housing 136 and camshaft 130, allow for measurement of relative cam position via cam timing sensor 150 providing signal VCT to control system 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, control system 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Alternatively, in some embodiments, one or more of the intake and/or exhaust valves may be controlled by electric valve actuation (EVA), or hydraulic valve actuation (HVA). As one example, the exhaust valves may be controlled by a variable camshaft timing system while the intake valves may be controlled by EVA. The valve timing and/or valve lift may be controlled by the control system by varying the current applied to the electromechanical valve actuators.

Continuing with FIG. 2, an exhaust gas recirculation system is shown. Exhaust gas may be delivered to intake manifold 44 by an EGR tube communicating with exhaust manifold 48 through an EGR valve assembly (not shown). Alternatively, the EGR tube could be an internally routed passage in the engine that communicates between exhaust manifold 48 and intake manifold 44.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66a, 66b, or combinations thereof depending on various factors, to control engine air-fuel ratio.

Figure 3:
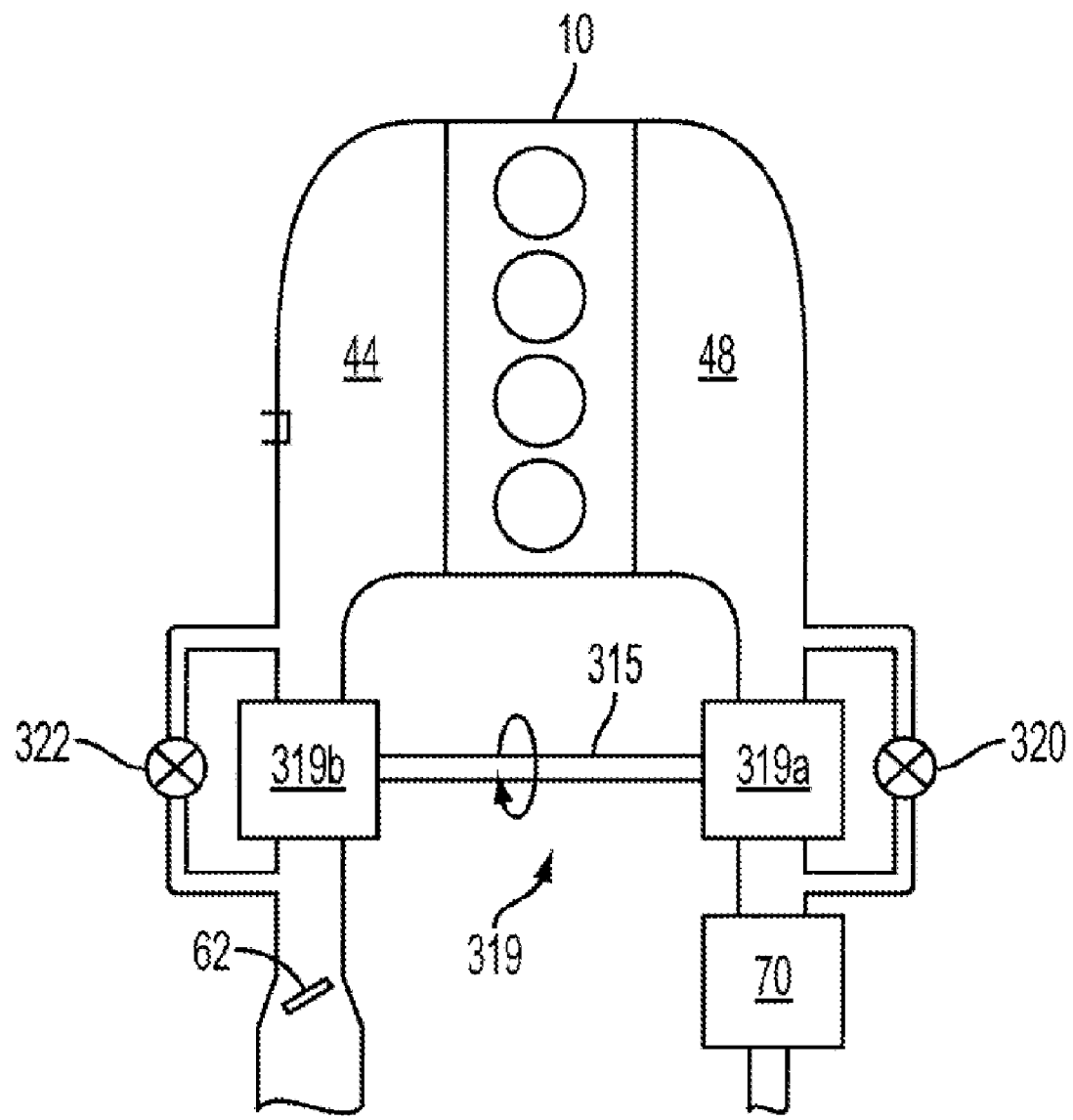
FIG. 3 illustrates an example boosting device that may be used with the engine of FIG. 1.

Also note that various methods can be used to maintain the desired torque such as, for example, adjusting ignition timing, throttle position, variable cam timing position, exhaust gas recirculation amount, and number of cylinders carrying out combustion. Further, some of these variables can be individually adjusted for each cylinder to maintain cylinder balance among all the cylinders. For example, intake and exhaust valve timing, intake and exhaust valve lift, spark timing, fuel injection timing, the number of fuel injections, the relative amount of each type of fuel or other substance injected into the cylinder, and the absolute amount of each type of fuel or other substance may be adjusted on an individual cylinder basis to vary the amount of torque produced by the cylinder. As shown in FIG. 3, engine 10 may be coupled to various boosting devices, such as a supercharger or turbocharger. On a boosted engine, desired torque may also be maintained by adjusting wastegate and/or compressor bypass valves. As described above, FIG. 2 merely shows one cylinder of a multi-cylinder engine, and it is understood that each cylinder has its own set of intake/exhaust valves, fuel injectors, spark plugs, etc.

FIG. 3 illustrates an example boosting device that may be used with engine 10. In this particular example, engine 10 is shown including four in-line cylinders, however, it should be appreciated that engine 10 may include any suitable number and/or configuration of cylinders. In this example, a boosting device is provided as a turbocharger 319. Turbocharger 319 includes a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315.

Various types of turbocharger arrangements may be used. For example, a variable geometry turbocharger (VGT) may be used where the geometry of the turbine and/or compressor may be varied during engine operation by control system 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be control system via control system 12 to vary the performance of the turbocharger. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Alternatively, a mechanically or electrically driven supercharger may be used as a boosting device for engine 10.

Figure 4A:
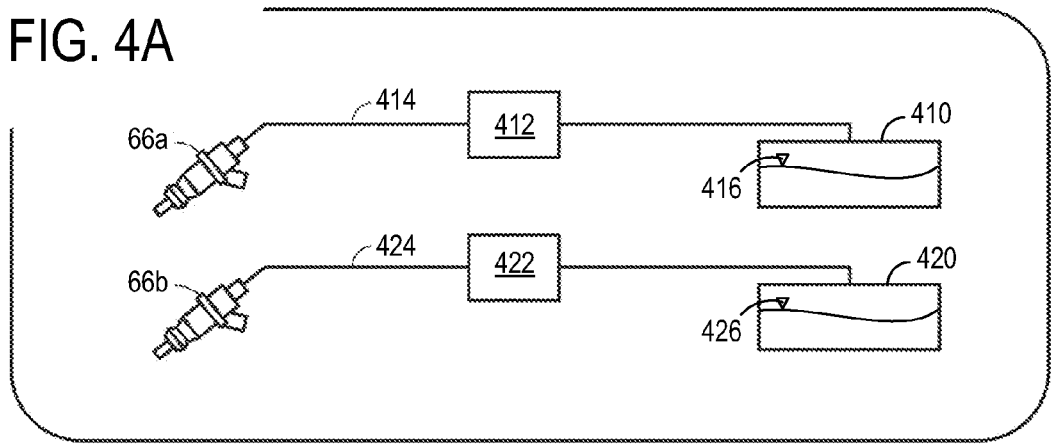
FIGS. 4A and 4B illustrate example fuel systems for the engine of FIG. 1.
Figure 4B:
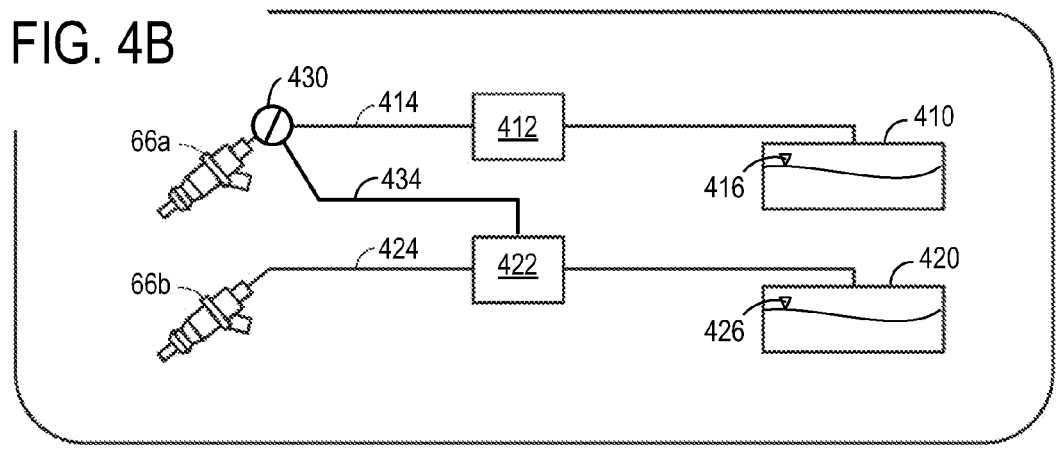

FIGS. 4A and 4B illustrate example fuel systems for engine 10. In particular, FIG. 4A shows a fuel system that includes a separate pump (e.g. fuel pump) and reservoir (e.g. fuel tank) for each injector. A first reservoir 410 can be configured to hold a first substance such as a liquid fuel liquid fuel. An amount of the first substance stored by reservoir 410 can be identified by the control system via sensor 416. Similarly, a second reservoir 420 can be configured to hold a second substance different from the first substance. An amount of the second substance stored by reservoir 420 can be identified by the control system via sensor 426. Sensors 416 and 426 may include any suitable sensor for identifying an amount a substance stored within a reservoir.

In some embodiments, the control system may estimate the amount of a substance stored within at least one of the reservoirs without utilizing a sensor. For example, sensor 426 may be omitted from reservoir 420, whereby the control system estimates the amount of the second substance stored within reservoir 420. The amount of a substance stored with the reservoir may be estimated based on an amount of the first fuel stored in reservoir 410 as identified by sensor 416, and further based upon previous injection strategies performed by the control system.

The first substance may be delivered to at least a first injector of the engine by a first pump 412 via a conduit 414. Similarly, a second substance may be delivered to at least a second injector of the engine by a second pump 422 via a conduit 424. Note that in this particular example, the first substance (e.g. an alcohol such as ethanol or an ethanol/gasoline mixture) may be delivered to the engine via direct injector 66a and the second substance (e.g. gasoline) may be delivered to the engine via port injector 66b. However, it should be appreciated that injector 66b may instead by configured as a direct injector.

By contrast, FIG. 4B illustrates a fuel system whereby two different substances may be delivered to the engine via a common injector. For example, direct injector 66a may selectively receive two different substances from reservoirs 410 and 420 responsive to the selected position of valve 430. As one non-limiting example, valve 430 may include a proportional valve that is controlled by an actuator responsive to a control signal from the control system. Thus, direct injector 66a can receive and inject only a first substance, only a second substance, or varying ratios of the first and the second substances. Further, in some embodiments, a pump such as pump 422 may supply a substance to multiple injectors. For example, as illustrated by FIG. 4B, pump 422 can supply the second substance to both direct injector 66a via conduit 434 and to port injector 66b via conduit 424.

While pumps 412 and 422 are shown outside of their respective reservoirs, in an alternative embodiment, one or both of the pumps may be located within a reservoir. Further, a second, high pressure fuel pump may be added to one or both the fuel lines downstream of respective pumps 412 and/or 422, which may be configured as low pressure pumps. Further, one or both the fuel systems may be returnless-type fuel systems, return-type fuel systems, or combinations thereof. Further, in some embodiments, the fuel systems for each substance may have different characteristics, such as different size reservoirs, different size pumps, different pump capacities, different pump pressures, different pump maximum flows, different on/off cycles (e.g., pump 412 may run more intermittently than pump 422), etc. Note that in some examples, only one pump may be operated under some conditions. For example, if a substance from tank 410 is not needed, or not enabled (e.g., during cold start conditions), pump 412 may be deactivated (or not activated) while pump 422 operates. In this way, less battery power may be used, and less vapors may be generated.

Figure 5:
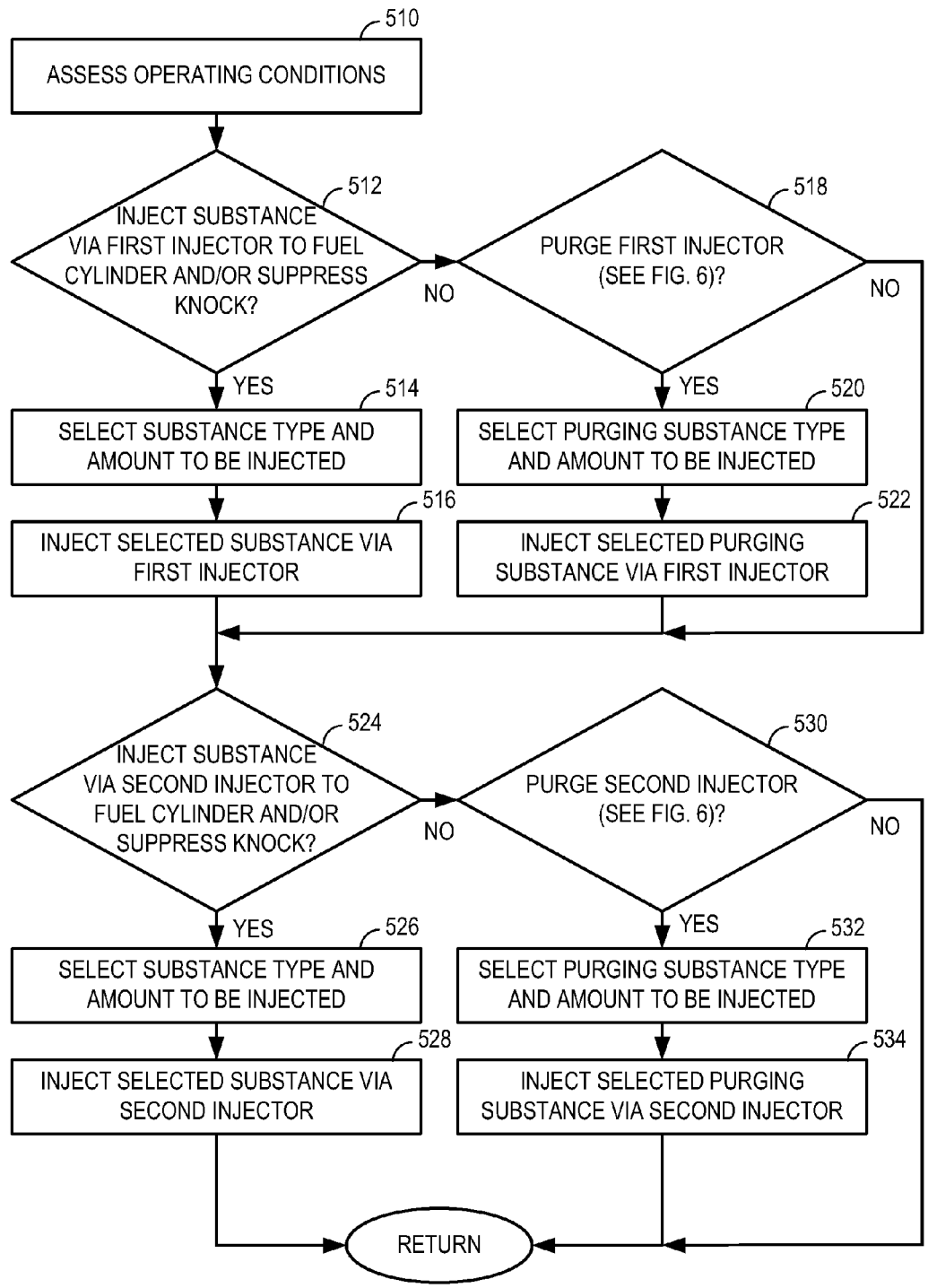
FIGS. 5 and 6 illustrate example routines that may be utilized by a control system for the engine of FIG. 1.
Figure 6:
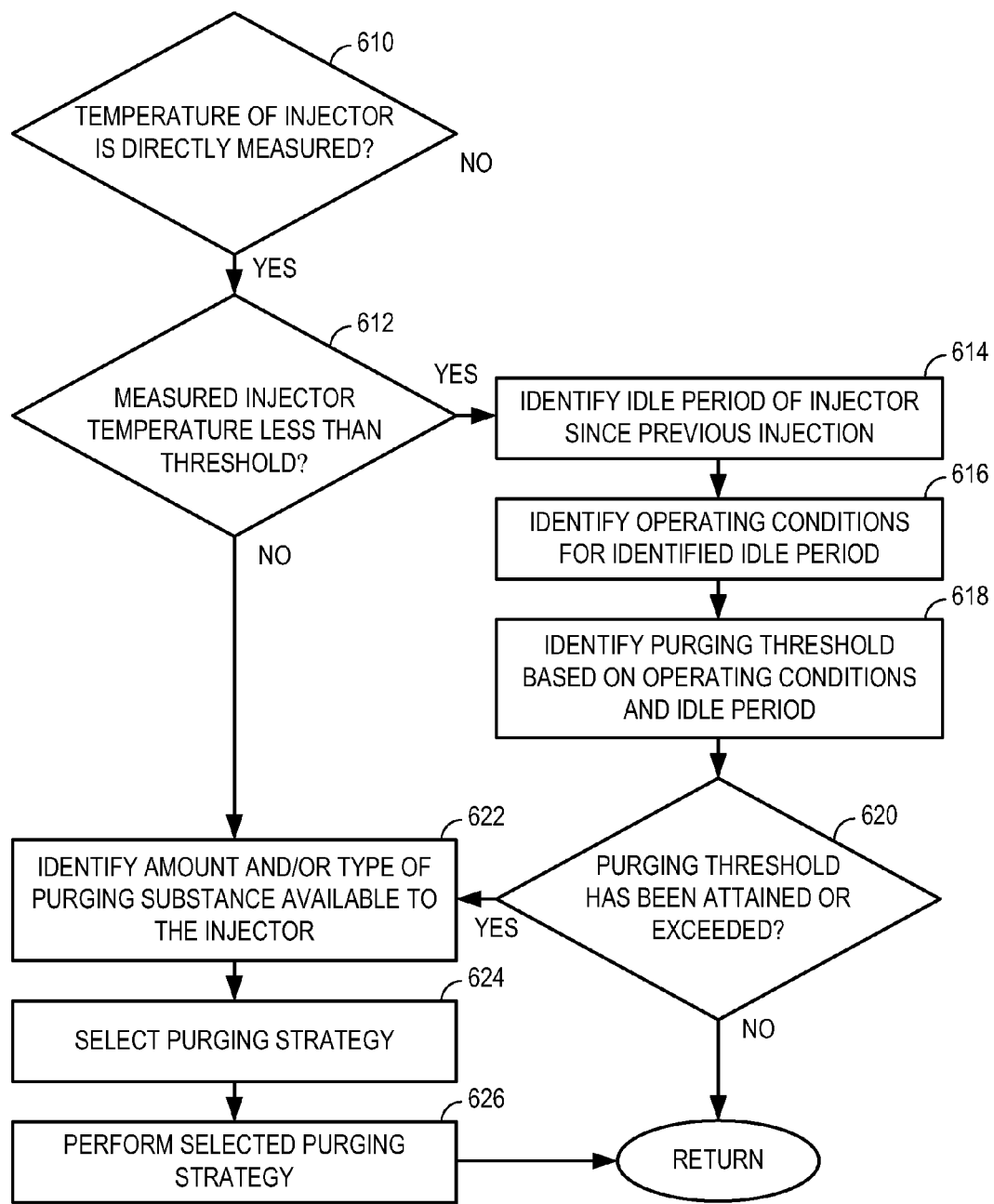

FIGS. 5 and 6 illustrate example routines that may be used to control operation of engine 10. As one non-limiting example, the routines of FIGS. 5 and 6 may be performed by the control system for each cylinder of the engine at least once per cycle. However, these routines may be performed at any suitable frequency. Note that the routines of FIGS. 5 and 6 will be described with reference to a single cylinder of the engine, for example, as illustrated by FIG. 2.

Referring to FIG. 5, at 510, the control system may assess the operating conditions of the engine or engine system. Operating conditions as described herein may include, but are not limited to one or more of the following: engine speed, engine load, engine torque, level of boost provided to the engine, throttle position, engine temperature, spark timing, intake or exhaust valve timing, vehicle speed, ambient air temperature, ambient air pressure, transmission conditions or states, catalyst conditions, composition of the products of combustion produced by the cylinder or engine, fuel injector state, fuel injector temperature, idle period since last injection of fuel or other substance by each injector, amount of fuel or other substance injected by each injector, quantity of fuel or other substances available for injection, type of fuel or other substances available for injection, and the combustion mode of the engine cylinders, among other sensed operating conditions described herein.

At 512, it may be judged whether a substance should be injected into the cylinder via a first injector to fuel the cylinder and/or suppress knock responsive to the operating conditions assessed at 510. As one example, the control system may utilize stored values such as a look-up table, learned values, and/or a look-up table shown, for example, in FIG. 7 to determine whether a substance should be injected via the first injector. For example, where the first injector is configured to inject only a first substance, the control system may judge that the first injector is to inject a substance if the first substance is to be delivered to the cylinder. As another example, where the first injector is configured to inject a substance that may also be injected by a second injector of the cylinder, the control system may determine whether there are benefits of injecting the substance via the first injector rather than the second injector. As one non-limiting example, the first injector may be configured to inject at least gasoline and may be configured as a port injector or a direct injector.

If the answer at 512 is yes, at least one substance and a corresponding amount of the substance may be selected at 514 where it may be injected by the first injector at 516. For example, the control system may select from one of a first substance and a second substance to be injected by the first injector and a corresponding amount of the substance for injection. Alternatively, the control system may select both the first and the second substance to be injected by the first injector. Note that the substance or substances selected at 514 may include any of the various substances described herein, including gasoline, ethanol, methanol, etc.

The control system may identify, based on the operating conditions assessed at 510, whether the cylinder is to be fueled and/or whether a knock suppressing substance is to be provided to the cylinder by the first injector. Where the cylinder is to be fueled via the first injector, a substance for fueling the cylinder may be selected. As one example, the control system may select gasoline, among other fuel substances. Where a knock suppressing substance is to be delivered to the cylinder via the first injector in addition to or as an alternative to the fuel, a knock suppressing substance such as ethanol may be selected, for example. Where the first injector is configured to inject only a single substance, for example, as shown in FIG. 4A, the operation at 514 may be omitted.

The amount of the substance to be injected can selected responsive to the stored or learned values of the control system based on the operating conditions assessed at 510. Furthermore, the amount of the substance injected can be adjusted in response to the injection performed by the other injector of the cylinder. For example, where the second injector performs an injection of gasoline, the amount knock suppressing substance injected by the first injector may be adjusted accordingly to achieve the desired air/fuel ratio, caloric content of the charge, and/or knock suppression. As another example, where the second injector is idle during the cycle or where the second injector performs an injector purge, the amount of the substance injected by the first injector may be varied accordingly. In this way, the amount of a substance delivered by an injector can be adjusted responsive to whether the other injector of the cylinder is purged or is idle.

Alternatively, if the answer at 512 is no, the routine may proceed to 518. At 518, it may be judged whether the first injector is to be purged as will be described in greater detail with reference to FIG. 6. If the answer at 518 is yes, at least one purging substance and an amount of the purging substance to be injected may be selected at 520 where it may be injected at 522 to purge the first injector.

As described herein, a purging substance may be injected by the first injector in response to operating conditions to reduce injector fouling that may occur from the deposition combustion products on the injector and/or excessive injector temperatures which could result in thermal degradation of the injector. In some examples, fouling and/or thermal degradation may result in misshaped spray patterns, error in the amount of injection or timing of injection, or complete failure of the injector. Purging substances may be provided as a liquid, gas, or varying mixtures thereof. Further, purging substances having varying compositions may be delivered via a single injector as described with reference to FIGS. 4B and 9F.

During some conditions, injector fouling and/or thermal degradation may be reduced by purging the injector prior to performing a substantial injection or periodically, thereby ensuring more accurate injection for purposes of fueling the cylinder and/or suppressing knock. By periodically operating the injector to perform an injection of a purging substance where the injector would otherwise be idle, the injector temperature may be reduced and/or deposited material may be removed, thereby improving injector reliability. The injector may be purged using a variety of purging strategies, for example, as described with reference to FIG. 9. As one non-limiting example, the first injector may be controlled to periodically inject a relatively small amount of a purging substance during conditions where knock suppression and/or fueling via the first injector is not needed and would otherwise be idle. Further description of the various purging strategies that may be employed are provided herein with reference to FIG. 6.

Alternatively if the answer at 518 no (i.e. the injector is not to be purged) or from 516 and 522, the routine may proceed to 524. The operations performed with reference to 524-534 for the second injector can be similar to the operations of 512-522 as described with reference to the first injector. Note that the second injector may be configured as a port injector or a direct injector and can be configured to inject the same or different substance as the first injector.

At 524, it may be judged whether to inject at least a substance via the second injector to fuel the cylinder and/or suppress knock. If the answer at 524 is yes, the substance and/or amount of the substance can be selected at 526, wherein the injection of the selected substance is performed by the second injector at 528. Alternatively, if the answer at 524 is no, it may be judged at 530 whether to purge the second injector. If the answer at 530 is yes, at least one purging substance and/or the amount of the purging substance may be selected at 532 where it may be injected via the second injector at 534. Finally, the routine may return.

A non-limiting example scenario will be provided to further enable the approach of FIG. 5. In this example scenario, the first injector may be configured as a port injector for injecting a fuel such as gasoline and the second injector may be configured as a direct injector for injecting a knock suppressing substance such as ethanol. During operation at lower engine loads and/or speeds, the relative amounts of gasoline and ethanol that are delivered to the cylinder may be less than during higher engine loads and/or speeds, whereby direct injection of ethanol is increased to provide greater knock suppression.

During some lower engine load and/or speed operations, injection of ethanol as a knock suppressing substance may be temporarily discontinued, thereby reducing ethanol consumption by the engine. Where injection of ethanol by the direct injector is discontinued for purposes of knock suppression, the injector may be idle. During this idle period the temperature of the injector may increase due to the reduction of injector cooling provided by the injected ethanol. Further, the amount of combustion products that are deposited on the injector may increase, potentially fouling the injector. Thus, during this low load condition, the direct injector may be periodically purged to reduce injector temperature and/or clear the deposited material. The purging substance may include the ethanol, or where the direct injector is configured to inject other substances such as gasoline, the direct injector may utilize gasoline as the purging substance to reduce ethanol consumption.

Similarly, during higher engine loads, where the amount of ethanol delivered to the cylinder is increased relative to the amount of gasoline, the injection of gasoline may be temporarily discontinued. Where the injector for injecting gasoline is a direct injector, injector fouling and/or thermal degradation may occur during this idle period of the gasoline injector. Similarly, where the gasoline injector is a port injector, thermal degradation and injector fouling may occur where the injector is idle for a sufficient period. Thus, during higher loads, where gasoline injection is temporarily discontinued, the gasoline injector may be purged by periodically injecting a purging substance. Note that the purging substance can include the gasoline or some other substance.

FIG. 6 shows a flow chart depicting a routine that may be performed by the control system to identify whether a purge of an injector is to be performed for mitigating the effects of injector fouling and/or thermal degradation that may occur where the injector is idle. At 610, it may be judged whether the temperature of the injector is directly measured. For example, where the control system can directly measure the injector temperature or infer the injector temperature with reasonable precision, the answer at 610 may be judged yes. If the answer at 610 is yes, it may be judged at 612, whether the measured injector temperature is less than a temperature threshold for the injector. The temperature threshold may be stored in memory of the control system and may be related to a design temperature of the injector or may be selected so that thermal degradation of the injector is reduced and/or eliminated. If the answer at 612 is yes (i.e. the injector temperature is less than the temperature threshold) or the answer at 610 is no (i.e. the temperature of the injector is not directly measured), the routine may proceed to 614. Alternatively, if the answer 612 is no, the routine may proceed directly to 622.

At 614, an idle period for the injector may be identified. As described herein, the injector idle period may refer to a temporal value including time, number of cycles, number of combustion events, etc. that have elapsed since a previous injection. Note that the previous injection may include an injection for fuel the cylinder, an injection of knock suppressing fluid, or a purge of the injector.

At 616, operating conditions for at least the idle period identified at 614. As one non-limiting example, the control system may assess one or more of the various operating conditions described with reference to 510.

Figure 8:
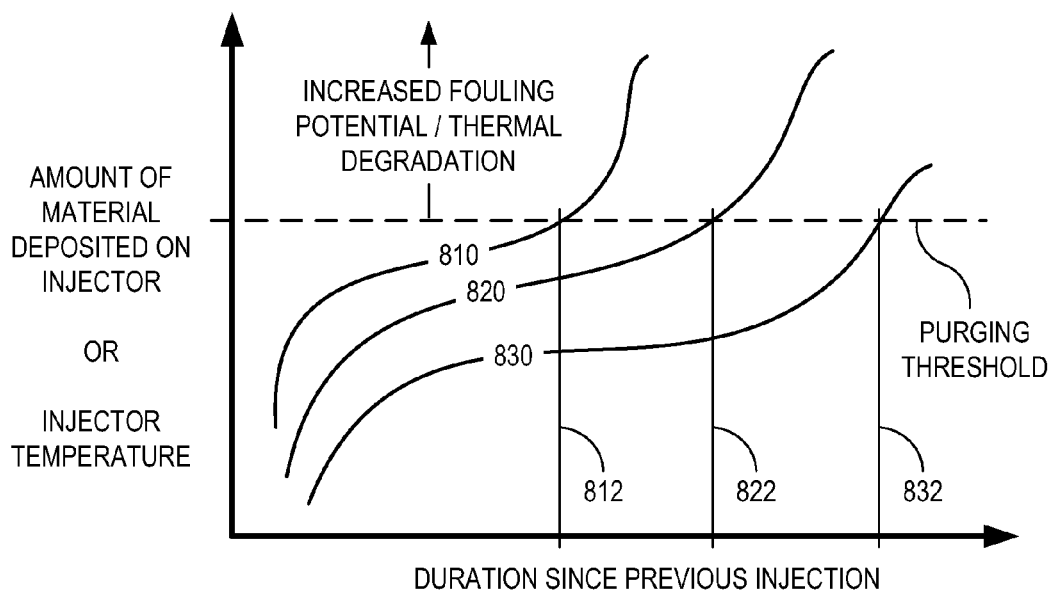

At 618, a purging threshold may be identified based on the operating conditions and the idle period identified at 614 and 616. As one example, the control system may identify the purging threshold for the operating conditions that the injector was subjected to over the idle period. In some embodiments, the control system may reference values stored in memory such as look-up table, learned values, or a map, an example of which is shown in FIG. 8. Note that the purging threshold may be based on or may include a threshold idle period for the injector, a threshold temperature of the injector, a threshold amount of fuel combusted in the cylinder over the idle period, for example.

At 620 it may be judged whether the purging threshold has been attained or exceeded. For example, where the purging threshold includes a maximum idle period for the injector, it may be judged that the purging threshold has been attained when the idle period reaches or exceeds the maximum idle period for the injector. As another example, where the purging threshold includes a maximum temperature of the injector, it may be judged that the purging threshold has been attained when the injector temperature, whether measured, inferred or estimated, reaches or exceeds the maximum temperature. As yet another example, where the purging threshold includes an amount of fuel combusted by the cylinder including the injector, it may be judged that the purging threshold has been attained when the fuel combusted by the cylinder reaches or exceeds the threshold amount of fuel.

If the answer at 620 is no, the routine may return to 610. Alternatively, if the answer at 620 is yes or if the answer at 612 is no, an amount and/or type of purging substance that is available to the injector may be identified at 622. For example, the control system may identify whether the injector is capable of injecting one, two, or more substances and the corresponding availability of the substances. As shown in FIG. 4B, an injector may be configured to inject two or more substances. However, where the injector is configured to inject only one type of substance, the operation at 622 may be omitted.

At 624, a purging strategy may be selected based on the amount and type of purging substances that are available to the injector, among other operating conditions. The purging selected at 624 may include a selection of a purging substance, an amount of purging substance to be injected, a timing of injection for the purging substance, and a frequency at which the injection is to be performed over one or more cycles. Examples of some purging strategies are described in greater detail with reference to FIG. 9.

It should be appreciated that with any of the purging examples described herein, the amount of purging substance used to purge the injector may be substantially less than a typical injection used to fuel the cylinder or provide knock suppression. In this way, the purging substance may be conserved. However, the amount of the purging substance may be the same as or greater than typical injections used for fueling or knock suppression during other conditions. Thus, the amount of purging substance can be selected based on the estimated or measured state of the injector and the desired reduction in injector fouling or temperature.

As one example, the control system may select a purging strategy that utilizes a purging substance that has the greatest relative availability. The relative availability between two purging substances may be judged based on the relative amount of each substance that is stored in their respective storage tanks. For example, where there is a greater amount of a first substance than a second substance, the first substance may be selected as the purging substance.

However, in some embodiments, the amount of each substance may be adjusted based on the injection strategy of the two substances. For example, where an injection strategy is applied, for example as described with reference to FIGS. 5 and 7, whereby a first substance such as gasoline may be injected in greater proportion than a second substance such as ethanol, the stored amount of each substance may be adjusted in response to the relative amount of each substance that is injected over an operating cycle of the engine. As one example, the control system may utilize learned values or stored values to identify average usage rates of the two substances and to adjust the stored amount of each substance accordingly. In other words, the control system may select a first substance as the purging substance over a second substance even where there is a greater amount of the second substance than the first substance if the second substance is generally used in greater proportion than the first substance. In this way, the substance with the greatest availability may be used as the purging substance, thereby increasing the efficiency and range of the vehicle.

In some embodiments, a purging strategy may be selected that utilizes a mixture of two or more substances. At 626, the selected purging strategy may be performed as directed by the routine of FIG. 5. Finally, the routine may return. Note that the routine shown in FIG. 6 may be performed for some or all of the injectors of the engine at a frequency of at least once per cycle, although the routine may be performed more or less often in some examples.

Figure 7:
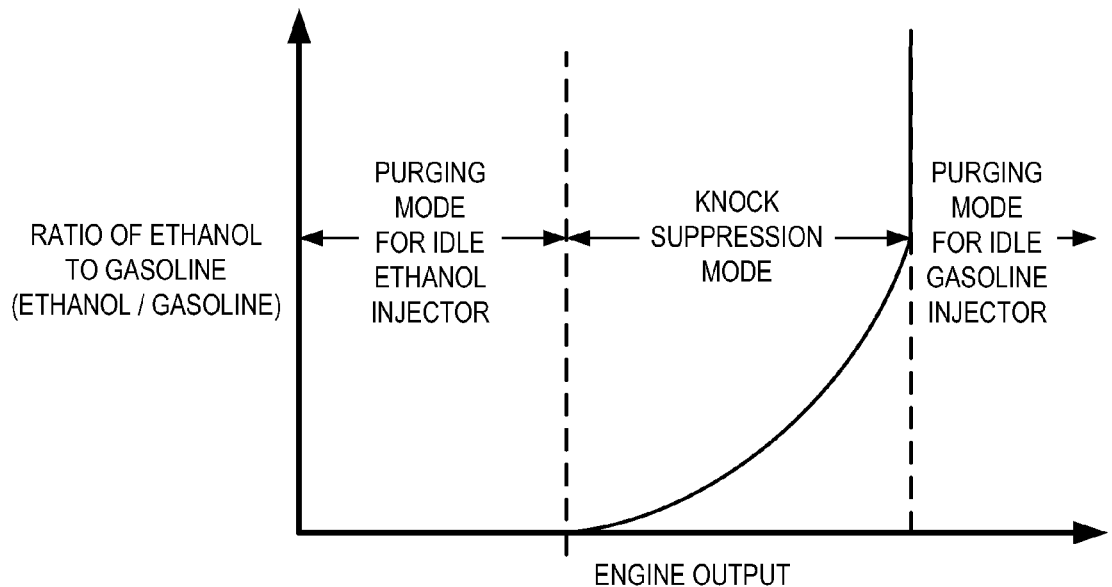
FIGS. 7 and 8 are graphs depicting example maps that may be used by the control system of the engine of FIG. 1.

FIGS. 7 and 8 are graphs depicting example control maps that may be stored in memory of the control system for controlling operation of engine 10. In particular, FIG. 7 illustrates how a relative amount of ethanol and gasoline that are delivered to the engine may be varied responsive to operating conditions such as engine output. Engine output may refer to engine load, speed, torque, etc. Further, it should be appreciated that engine output may be positively correlated with a level of boost provided to the engine by a boosting device.

As illustrated by FIG. 7, direct injection of ethanol or other knock suppressing substance may be initiated at some threshold engine output, where it may be increased relative to an amount of gasoline that is delivered to the engine with further increase of output. By utilizing the knock suppressing substance only after reaching a threshold engine output, the amount of knock suppressing substance consumed by the engine may be reduced, particularly at lower engine output conditions. However, extended operation below the threshold engine output for use of the knock suppressing fluid may increase the likelihood of injector fouling and/or thermal degradation without the use of a periodic purge of the injector. Similarly, during higher engine outputs, gasoline injection may be temporarily discontinued at which purging of the gasoline injector may be performed. Thus, a synergy between the periodic use of knock suppression and injector purging may be achieved where they are selectively used in a complimentary manner as described herein.

FIG. 7 illustrates how the engine may be operated in one of these two modes of operation. The purging mode, whereby a purging substance may be selectively injected by the injector to reduce fouling and/or thermal degradation may be performed at lower engine outputs and a knock suppression mode, whereby a knock suppressing substance (e.g. ethanol) may be utilized to reduce knock at higher outputs. Thus, during the knock suppression mode, both injectors may be used. Note that while the graph illustrated by FIG. 7 indicates a positive correlation between engine output and the ratio of ethanol to gasoline that is delivered to the engine, it should be appreciated that other maps may be used that indicate different correlations.

FIG. 8 illustrates how a purging threshold for purging an injector can vary with operating conditions identified by the control system and an idle period since a previous injection. The horizontal axis of the graph indicates an idle period since a previous injection by the injector (e.g. the current idle period of the purging mode 612 identified by FIG. 6). Note that an injection may include a purge or an injection for purposes of knock suppression or fueling the cylinder. The vertical axis of the graph indicates, as a prophetic example, the amount of material deposited on the injector or a temperature of the injector for a given set of operating conditions. A family of curves representing different sets of operating conditions are indicated at 810, 820, and 830. For each set of operating conditions, as the idle period since a previous injection increases, the amount of material deposited on the injector or alternatively the temperature of the injector may increase (or potentially decrease) at different rates depending on the particular operating conditions of the engine as indicated by 810, 820, or 830, for example.

As the idle period since a previous injection increases, the amount of deposited material or temperature of the injector may increase as indicated by one of curves 810, 820, or 830 until reaching a level after which fouling of the injector may occur or the potential for fouling may significantly increase. Similarly, the temperature of the injector may vary with operating conditions until reaching a temperature threshold at which thermal degradation of the injector may occur or the potential for thermal degradation of the injector may significantly increase. For each set of operating conditions, a purging threshold may be identified. For example, for a first set of operating conditions indicated by 810, the purging threshold may be identified at 812. In this way, the injector may be purged at the idle period indicated by the purging threshold at 812, which may also correspond to the level of deposition where fouling and/or thermal degradation may begin to occur. Similarly, for a second set of operating conditions different from the first set, for example, as indicated at 820 or 830, a purging threshold may be identified at 822 or 832, respectively. Thus, as illustrated by FIG. 8, the purging threshold can vary based on operating conditions, whereby the purging threshold can be correlated with a particular idle period since a previous injection by the injector. In this way, the control system identify a idle period at which the injector may be purged to reduce fouling and/or thermal degradation of the injector.

In some embodiments, the purging threshold can be set to a particular idle period based on a weighting of operating conditions. For example, during a particular period of time, the operating conditions can be used to weight the idle period at which the purge is performed according to rpm, load, torque, amount and/or type of fuel combusted, air/fuel ratio, engine temperature, etc., among other operating conditions. As another example, as an amount of fuel combusted by the engine is increased, the purging threshold for purging an idle injector can decrease, thereby reducing the idle period at which the purging threshold is exceed resulting in more frequent purges of the injector. Further, the composition of the products of combustion created by the cylinder (e.g. as sensed by an exhaust gas sensor) may be considered, which may include an estimation or measurement of an amount of soot produced during combustion, a state of the injector including injector temperature, or an estimation of injector fouling and/or thermal degradation. In this way, the amount of a purging substance that is used to purge an injector may be reduced while also reducing fouling and/or thermal degradation of the injector by considering how operating conditions vary during the idle period since a previous injection and selecting purging threshold accordingly.

FIGS. 9A-9F illustrate specific examples of injection strategies that may be performed by the control system. In each of FIGS. 9A-9F, the quantity of each substance that is injected into a cylinder of the engine is described with reference to the vertical axis of the graph while a temporal representation of a plurality of cylinder cycles are illustrated on the horizontal axis. Note that the timing of the injections within a particular cycle are provided schematically, and are not necessarily representative of the actual injection timings that may be used. Further still, it should be appreciated that the examples described with reference to FIGS. 9A-9F are specific examples and that the first fuel, second fuel, and purging substance may include any of the various substances described herein.

Figure 9A:
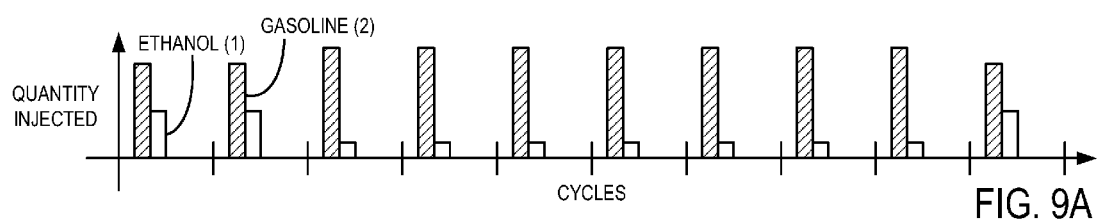
FIGS. 9A, 9B, 9C, 9D, 9E, and 9F illustrate specific example injection strategies that may be performed by the control system for the engine of FIG. 1.

Referring to FIG. 9A, an injection strategy is shown whereby gasoline injection is performed via a second injector as indicated by "Gasoline (2)". For a first number of cycles, an ethanol injection is also utilized in addition to the gasoline as a knock suppressing substance as indicated by "Ethanol (1)". Note that the first injector in these examples may be configured as a direct injector and the second injector may be configured as a port injector or alternatively as a second direct injector. The relative amount of ethanol and gasoline that are delivered to the cylinder during the knock suppression mode may be directed by the map illustrated in FIG. 7, for example. However, other suitable control strategies may be utilized to vary the relative amounts of a first and second fuel that are delivered to the engine in response to operating conditions.

After the injection of the ethanol as a knock suppressing substance over multiple cycles, the amount of ethanol injection may be reduced, for example, with a change in operating conditions. As illustrated by FIG. 9A, a relatively smaller ethanol injection may be continued by the first injector in order to continuously purge the first injector so that fouling or sufficiently high injector temperature conditions do not occur or are reduced. As one example, the amount of the purging substance that is continuously (e.g. at least once per cycle) or intermittently injected by the injector may be varied in response to operating conditions of the engine since the previous injection, for example, as described with reference to FIG. 6. After a plurality of cycles where purging is performed, substantial ethanol injection may again be initiated in response to operating conditions of the engine in order to reduce knock.

Figure 9B:
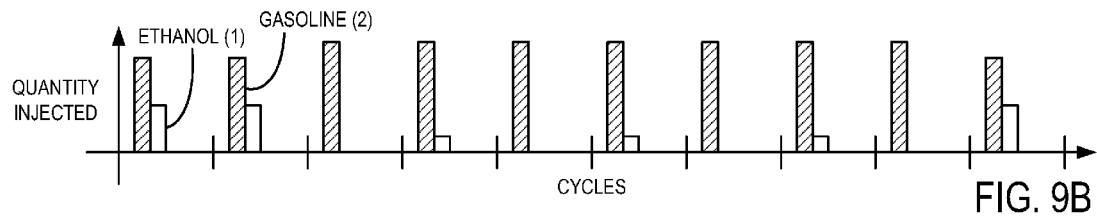

By contrast, FIG. 9B illustrates an injection strategy, whereby the first injector is intermittently purged by injecting a purging substance such as ethanol. For example, as illustrated by FIG. 9B, ethanol injection is utilized as a purging substance intermittently at a frequency of every other cycle to reduce fouling and/or thermal degradation of the first injector.

Figure 9C:
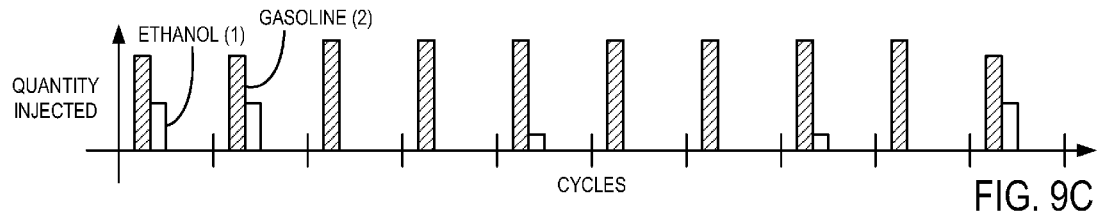
Figure 9D:
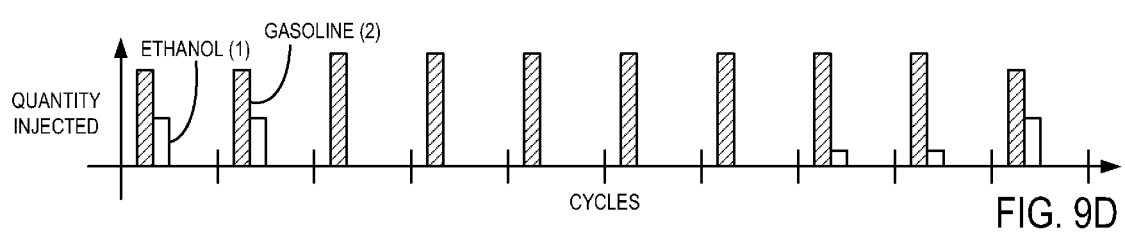
Figure 9E:
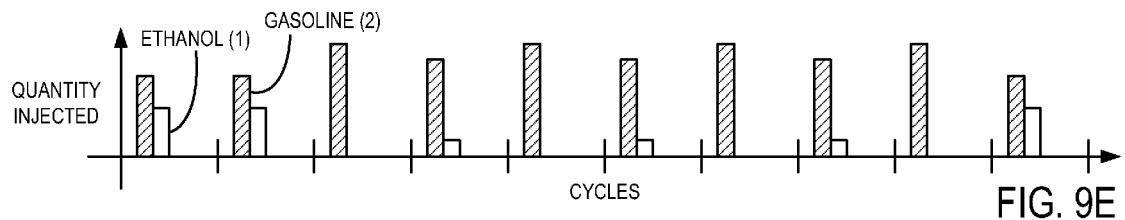

Note that the amount of the gasoline delivered to the cylinder may be adjusted during the cycles where purging is performed responsive to an amount of the purging substance that is injected in order to compensate for any change in air/fuel ratio or caloric content of the charge that may occur, for example, as illustrated by FIG. 9E. It should be appreciated that while a purging cycle as illustrated by FIG. 9B may be performed at frequency of every other cycle, intermittent purging of the injector may be performed more or less frequently based on operating conditions. For example, FIG. 9C illustrates an example where the first injector is purged less frequently than the purging strategy of FIG. 9B. The frequency at which a purge is performed to reduce injector fouling and/or thermal degradation may be identified by the control system by referencing a look-up table or map stored in memory as illustrated in FIG. 8B, for example.

FIG. 9D illustrates yet another injection strategy that may be performed, whereby ethanol is injected as a purging substance for a number of cycles just prior to entering a knock suppression mode, for example, in response to a requested increase in engine output. Purging of the injector may be performed for any suitable number of cycles before the injector is to be used to provide knock suppression, with or without appropriate adjustment to the amount of the second substance (e.g. gasoline) that is delivered to the cylinder. By utilizing purging just prior to operation of the injector used for knock suppression, the amount of purging substance used to reduce fouling and/or thermal degradation may be reduced, while also ensuring that the injector is prepared to perform a substantial injection of a knock suppressing substance when directed.

FIG. 9E illustrates an example similar to FIG. 9B, whereby the amount of gasoline delivered to the cylinder is adjusted responsive to whether an intermittent purge is performed as well as the amount and/or type of purging substance that is utilized. In this example, the amount of gasoline that is delivered to the cylinder during a cycle where purging of the injector is performed may be adjusted (e.g. reduced) to compensate for a change in the air/fuel ratio or output of the cylinder that would otherwise occur. Thus, in this particular example, the amount of gasoline injected into the cylinder is reduced during a cycle where ethanol is used as the purging substance, however, it may be increased in other examples. For example, where water is used as the purging substance, the amount of gasoline delivered to the cylinder during a cycle where a purge is performed may be increased. Note that the amount of adjustment or offset of the injected fuel may be based on the caloric content of the purging substance and/or the oxygen content of the purging substance to reduce fluctuations in torque output and/or exhaust emissions of the engine.

Figure 9F:
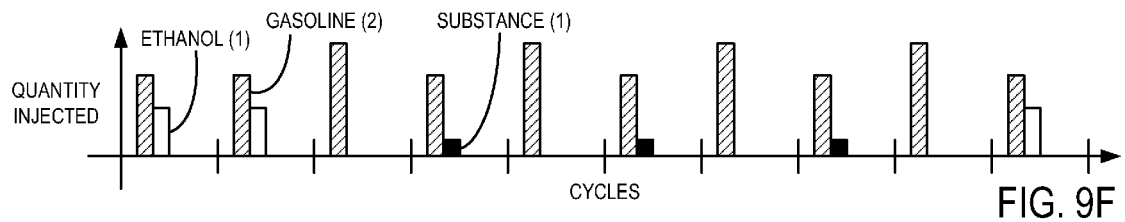

FIG. 9F illustrates yet another example of a purging operation, whereby a substance other than ethanol is used as the purging substance for the first injector. As one example, the substance may include gasoline, water, or other substance. For example, as described with reference to FIG. 4B, the first injector may selectively inject at least one of two different substances as the purging substance. Note that the correction or offset of the gasoline injection that is performed responsive to the purging operation may vary in response to the purging substance that is utilized during the cycle. For example, the offset of gasoline delivered to the cylinder during a purging cycle may differ between the strategies of FIGS. 9E and 9F, since the type of purging substance differs. As one example, where the purging substance includes a "non-fuel" such as water, the amount of gasoline injected during the cycle where a purge is performed may be adjusted differently than if the purging substance includes gasoline, ethanol, methanol, or other substance. In this way, a target air/fuel ratio and a level of torque produced by the engine may be maintained.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of operating an engine of a vehicle, the engine having a variable engine output, the method comprising:
    during a first engine output, delivering a first fuel to at least a cylinder of the engine via a first injector and directly injecting a second fuel directly into said cylinder via a second injector; and
    during a second engine output lower than said first engine output, delivering said first fuel to said at least a cylinder of the engine via said first injector and directly injecting at least a purging substance via said second injector based on an idle period since a previous injection by said second injector.

2. The method of claim 1, wherein said idle period is weighted based on an operating condition.

3. The method of claim 2, wherein said operating condition includes a rotational speed of the engine.

4. The method of claim 2, wherein said operating condition includes an engine load.

5. The method of claim 1 further comprising, during said second engine output, varying an amount of said first fuel that is injected via said first injector responsive to an amount of said purging substance that is injected via said second injector.

6. The method of claim 5, wherein said amount of said first fuel is reduced as said amount of said purging substance is increased.

7. The method of claim 1, wherein said purging substance includes said second fuel.

8. The method of claim 1, wherein said purging substance includes said first fuel.

9. The method of claim 1, wherein said purging substance includes water.

10. The method of claim 1, wherein said first fuel includes gasoline and said second fuel includes an alcohol.

11. The method of claim 10, wherein said alcohol includes ethanol.

12. The method of claim 1, wherein said first injector is a port injector.

13. The method of claim 1, wherein said first injector is a first direct injector.

14. The method of claim 1, further comprising, varying a composition of said purging substance responsive to an availability of said second fuel.

15. The method of claim 14, wherein said composition of said purging substance includes at least one of said second fuel and a first substance; and wherein said composition is varied to reduce a relative amount of said second fuel in said purging substance compared to said first substance as an availability of said second fuel is reduced.

16. The method of claim 15 further comprising, during said second mode, further varying said amount of said first fuel delivered to said cylinder responsive to a composition of said purging substance that is injected into the cylinder.

17. A method of operating an engine of a vehicle, the engine having a variable engine output, the method comprising:
during a first engine output, delivering gasoline to at least a cylinder of the engine via a first injector and directly injecting ethanol directly into said cylinder via a second injector; and
during a second engine output lower than said first engine output, delivering gasoline to said at least a cylinder of the engine and intermittently injecting at least a purging substance directly into said cylinder via said second injector;
wherein a frequency of said intermittent injection of said purging substance is varied responsive to an operating condition, and where said purging substance includes at least one of gasoline, ethanol, and water.

18. The method of claim 17, wherein said operating condition includes a number of cycles performed by said cylinder since a previous injection of said ethanol by said second injector.

19. The method of claim 18, wherein said operating condition further includes a composition of the products of combustion produced by said cylinder during said number of cycles.

20. The method of claim 17 further comprising, during at least said second mode, reducing an amount of gasoline injected by said first injector responsive to an increase in an amount of said purging substance injected by said second injector.

21. The method of claim 17, wherein said operating condition includes a temperature of the second injector.

22. A method of operating an internal combustion engine for a road vehicle, the method comprising:
delivering a first fuel to at least a cylinder of the engine via a first injector and combusting at least said first fuel to produce a first level of torque;
injecting a purging substance directly into said cylinder via a second injector to purge said second injector during at least one engine cycle prior to an increase in torque produced by the engine from said first level of torque to a second level of torque;
delivering said first fuel to said cylinder via said first injector, injecting a second fuel directly into said cylinder via the second injector, increasing a level of boost provided to the engine, and combusting at least said first fuel and said second fuel to produce said second level of torque greater than said first level of torque;
wherein said first fuel includes gasoline, said second fuel includes an alcohol, and said purging substance includes at least one of gasoline and said alcohol.

23. The method of claim 22 further comprising, varying a frequency of injections of said purging substance via said second injector prior to said increase in torque based on a number of cycles elapsing from a previous injection of said second fuel by said second injector or is based on a temperature of said second injector.

* * * * *